J. R. MOFFATT.
TRIMMING MECHANISM FOR SEWING MACHINES.
APPLICATION FILED FEB. 5, 1914.
1,253,865.
Patented Jan. 15, 1918.
5 SHEETS—SHEET 2.
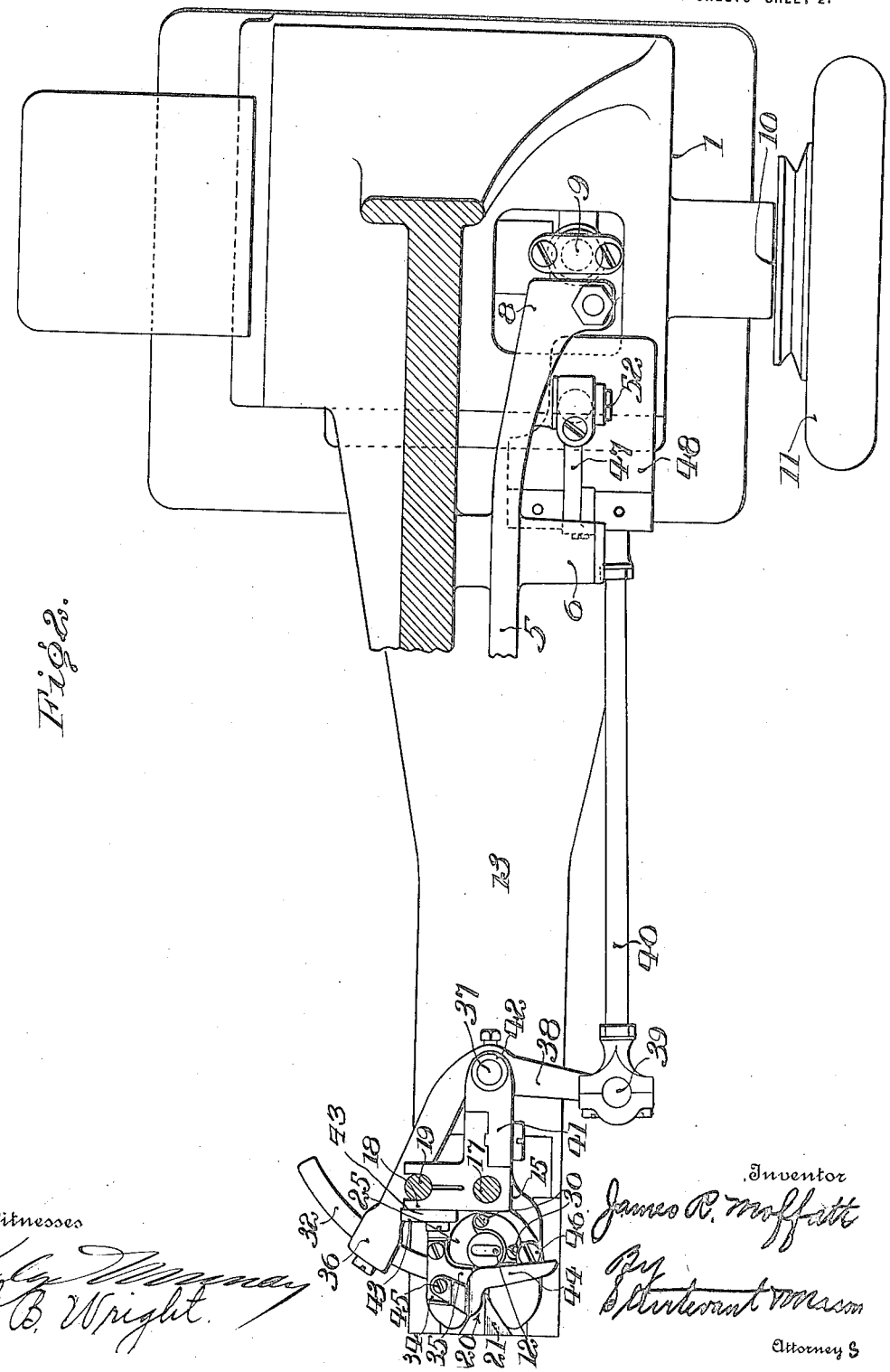

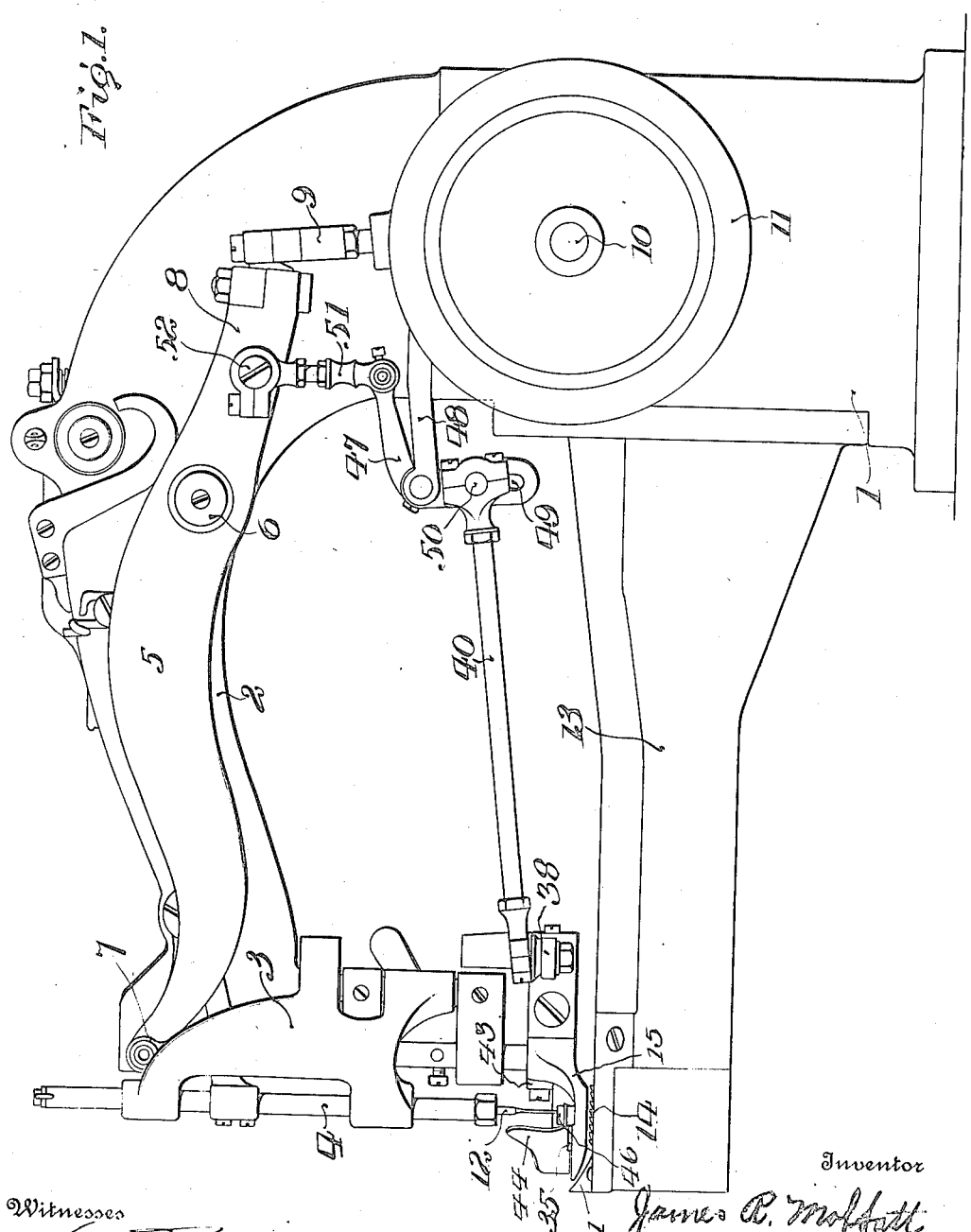

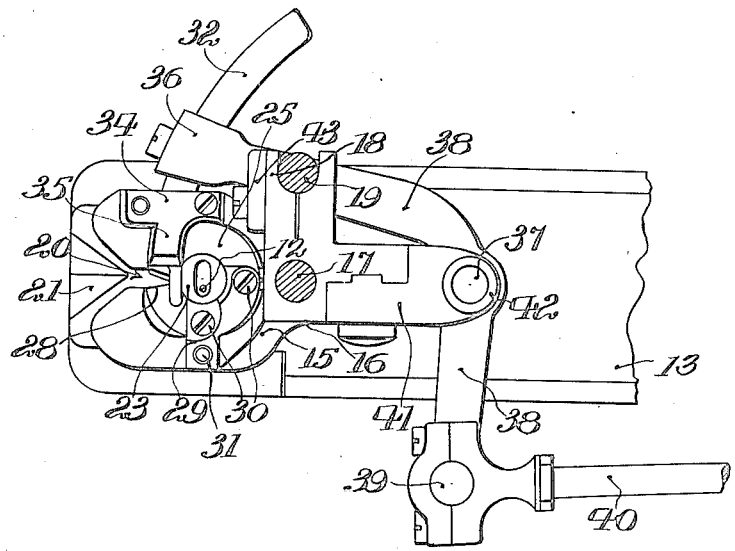
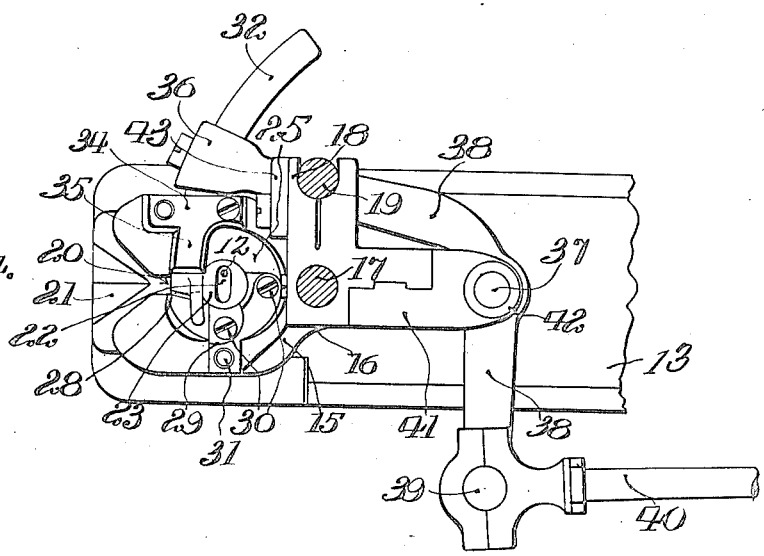

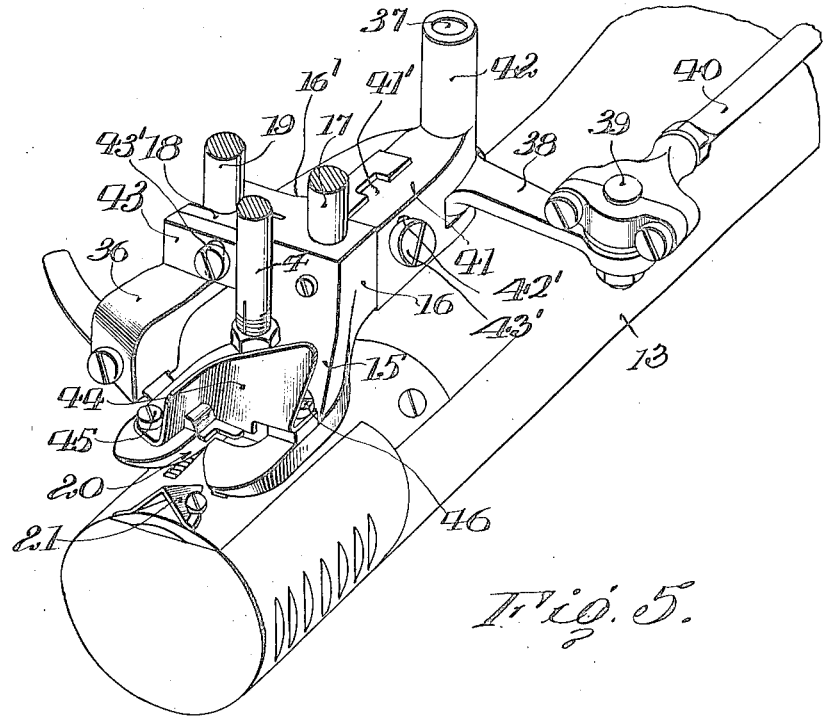
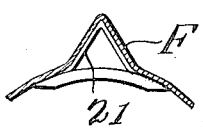
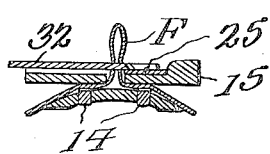
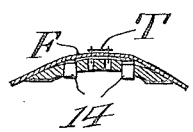
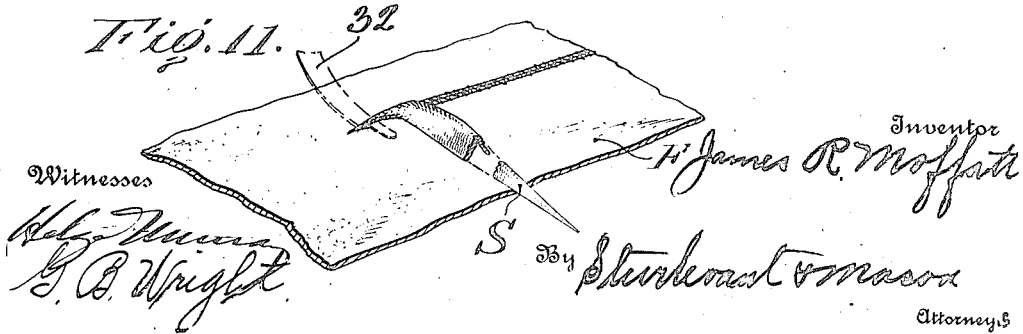

J. R. MOFFATT.
TRIMMING MECHANISM FOR SEWING MACHINES.
APPLICATION FILED FEB. 5, 1914.

1,253,865.

Patented Jan. 15, 1918.
5 SHEETS—SHEET 5.

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

TRIMMING MECHANISM FOR SEWING-MACHINES.

1,253,865.  Specification of Letters Patent.  Patented Jan. 15, 1918.

Application filed February 5, 1914. Serial No. 816,783.

*To all whom it may concern:*

Be it known that I, JAMES R. MOFFATT, a citizen of the United States, residing at Chicago, in the county of Cook, State of Illinois, have invented certain new and useful Improvements in Trimming Mechanism for Sewing-Machines, of which the following is a description, reference being had to the accompanying drawing and to the figures of reference marked thereon.

The invention relates to new and useful improvements in trimming mechanisms for sewing machines, and more particularly to a trimming mechanism wherein the trimming members operate in substantially a horizontal plane in advance of a cross-stitching mechanism for trimming the edges of fabric, which edges are abutted and joined by cross-stitching.

An object of the invention is to provide a trimming mechanism wherein the movable trimming blade is postively reciprocated back and forth and is held in proper contact with its coöperating member.

A further object of the invention is to provide a presser foot with mechanism for supporting the trimming devices, and with a deflector which is fixed to the presser foot for deflecting the trimmed-off strip away from the stitching mechanism.

These and other objects will in part be obvious, and will in part be hereinafter more fully disclosed.

In the drawings, which show by way of illustration one embodiment of the invention,—

Figure 1 is a side elevation of a sewing machine embodying my invention;

Fig. 2 is a vew partly in section and partly in plan, showing the trimming mechanism, the work support and presser foot;

Fig. 3 is an enlarged detail view, showing partly in section and partly in plan the trimming mechanism and presser foot with the trimming blade retracted;

Fig. 4 is a similar view, showing the trimmer blade in its forward position;

Fig. 5 is an enlarged perspective view, showing the presser foot, the trimming mechanism and the forward end of the work support;

Fig. 6 is a detail in cross section, showing the fabric as it is bent prior to entering the presser foot;

Fig. 7 is a transverse sectional view through the presser foot and the trimming mechanism;

Fig. 8 is a transverse sectional view at the stitching point;

Fig. 11 is a detail in perspective showing more or less diagrammatically the fabric, the trimming blade, the trimmed-off strip and the joined abutted edges.

Figure 9:
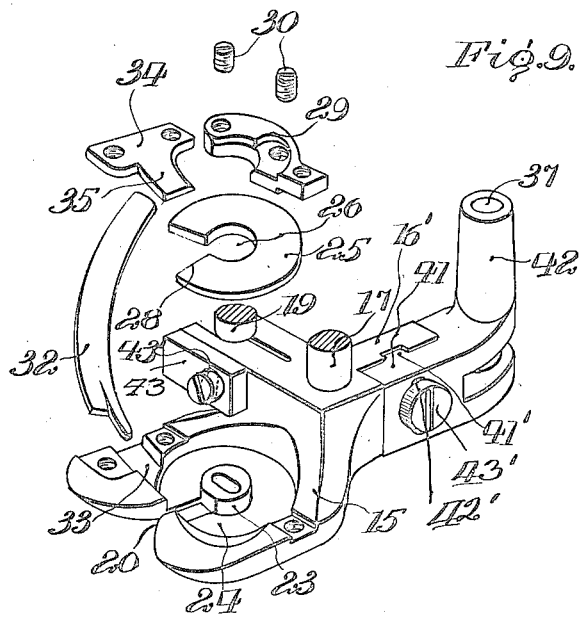
Fig. 9 is a perspective view, showing the presser foot, the trimming members and clamping devices therefor, the parts being separated to show the structure.

The trimming mechanism embodying my improvement is of the type wherein the trimming blades operate in a horizontal plane in advance of cross-stitching mechanism, and includes devices for positively reciprocating the trimming blade in both directions; devices for holding the trimming blade so as to prevent lateral deflection during the trimming action; devices fixed to the presser foot and extending from one side of the needle to the other for deflecting the trimmed-off strip.

Referring more in detail to the drawings, I have shown the invention as applied to a side wheel feed-up-the-arm machine, consisting of a supporting base or standard 1 carrying an overhanging arm 2, on which is mounted a needle gate 3. A needle bar 4 reciprocates in the needle gate. This needle bar is reciprocated by the needle lever 5, which is pivoted at 6 to the overhanging arm.

A link 7 joins the needle lever to the needle bar. The needle lever extension 8 is connected to a link 9 which coöperates with an eccentric on the main shaft 10, which is actuated by the usual belt wheel 11.

A needle 12 is mounted in the needle bar and the needle gate 3 is vibrated by the usual mechanism for causing said needle 12 to enter the fabric first at one side of the center line of seam and then at the other side thereof. A cylindrical arm or work support 13 is carried by the standard 1, and projects underneath the overhanging arm 2. A feed dog 14 is so disposed and operated as to feed the material up the arm 13. A looper mounted in the work support coöperates with the needle. This looper is of the usual type and the looper thread is formed into loops which not only lock the needle loops but extend across the center line of the seam and join the needle loops on opposite sides thereof. The needle and looper constitute a cross-stitching mechanism which joins the abutting edges of the fabric.

The above parts are of the usual construction, and further description thereof will not be necessary.

A presser foot 15 coöperates with the work support in holding the fabric on the feed dog 14. This presser foot 15 has a shank 16 which is secured to the lower end of the presser bar 17. Said shank also has a laterally projecting arm 18 which carries a guide bar 19 which extends through suitable bearings in the overhanging arm and prevents the presser foot from turning about the axis of the bar 17. The presser foot is slotted at 20. This slot extends from the forward end of the presser foot centrally thereof into the presser foot and the side walls of the slot are tapered outwardly.

The work support is provided with a V-shaped deflector 21, which turns up the edges of the fabric when sections are to be trimmed and joined, or forms a fold in the fabric when a section is to be cut from the same and the edges afterward joined.

The needle 12 passes through a needle opening 22 formed in a cylindrical boss 23 carried by the presser foot 15. The slot 20 leads to the front face of the boss 23. The upper face of the presser foot is formed with an annular recess 24, the boss 23 forming the central wall of said recess. A stationary trimmer blade 25 is formed so as to fit said annular recess 24.

Figure 10:
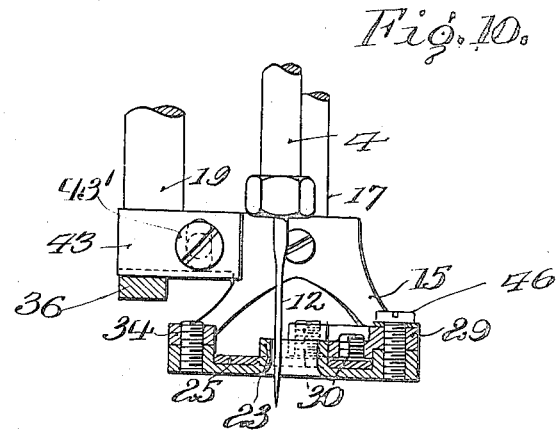
Fig. 10 is an enlarged sectional view through the presser foot at the needle slot.

In other words, this stationary trimmer blade 25 is annular in shape having a central opening 26, which fits the boss 23. A section is removed from the blade, so as to form a cutting edge 28. This stationary blade is placed in the recess 24, and is held therein by a clamping arm 29, which carries screws 30 adapted to press against the blade, as clearly shown in Fig. 10 of the drawings. This clamping arm is recessed as shown in Fig. 9, to allow proper clearance in the descent of the needle bar. A clamping screw 31 clamps the arm 29 to the presser foot, and causes the screws 30 to press against the blade to hold it firmly in the recess 24. I do not make claim to the special construction of stationary trimmer blade parts, as that is not my invention.

A movable cutting blade 32 is mounted so as to reciprocate in a substantially horizontal plane. The presser foot is recessed, as at 33, to form a guideway for this movable blade 32.

A bridge plate 34 spans the guideway 33 and is secured to the presser foot by suitable screws. This bridge plate has a forwardly projecting arm 35, which bears against the blade at a point adjacent the slot 20, that is, a point adjacent the trimming line, and holds the blade in proper coöperative relation to the stationary trimming member 25.

The movable blade 32 is mounted in an arm 36 which is in the form of a rock lever supported by a shaft 37. The other end of the rock lever 38 carries a ball stud 39, to which is pivotally attached a link 40. The shank of the presser foot 16 has a rearwardly projecting arm 41 which is slotted to receive the rock lever, and the shaft 37 carried by this arm forms a pivotal support for the rock lever. The arm is provided with an extended bearing 42, so as to prevent the rock lever from tilting during the oscillations thereof. The arm 41 has a tongue 41' fitting in a groove in the extension 16' of the presser foot shank 16. The arm 41 is secured to the extension 16' by a screw 43', which passes through an elongated slot 42' in the arm.

It will be noticed that by this arrangement, the arm or bracket 41 may be vertically adjusted, by which the knife-carrying arm may be raised and lowered, to accommodate varying thicknesses of knives.

A hardened block 43 carried by the arm 18, bears against the arm 36 carrying the cutting blade, and also tends to hold said cutting blade in proper coöperative relation to the stationary cutting blade, giving a firm support for the arm 38, and, therefore, the movable knife. This block is adjustable up and down on the presser foot shank by means of a screw and elongated slot arrangement, as shown at 43'. In assembling these parts, the stationary knife is first secured in position and the arm 38 is adjusted vertically, so that the movable knife 32 is placed in its proper relation to the stationary blade. After the arm 38 has been adjusted, the block 43 is swung up or down until it bears upon said arm 38. By this means, the forward end of the arm 38 and consequently the movable knife is prevented from being moved up, due to the shearing action. The arm 38 is disposed about three-eighths of an inch below the forked arm 18, which allows for the vertical movement of said arm 38.

A stationary deflector 44 is attached to the presser foot by suitable screws 45 and 46. This deflector is L-shaped. One part of the deflector extends substantially parallel with the slot 20 over the trimming blade, while the other member extends across the slot from one side of the needle to the other side of the needle, and serves to deflect the trimmed-off strip away from the stitching mechanism.

The pitman is pivoted to a second rock lever 47 which is fulcrumed on a bracket 48 secured to the standard 1. The lower arm of the rock lever 47 is slotted, as at 49, and a ball stud 50 is adjustably secured in said slot. The other arm of the rock lever 47 is pivotally connected to a link 51, which in turn is connected to a ball stud 52 on the needle lever extension 8. As the needle lever oscillates, the rock lever 47 will be oscillated and through the link 40 will oscillate the cutting blade 32. The parts are so timed and constructed that this cutting blade is positively moved back and forth and in timed relation to the needle, so that the cutting blade will be out of contact with the fabric while the needle is raised and during the forward feed of the fabric. The link 40 is of such length that the presser foot may be raised and lowered without interfering with the actuations of the cutting blade.

In the operation of my device, the fabric (indicated at F in Figs. 6, 7, 8 and 11,) is fed to the machine and the deflector 21 forms a fold in the fabric, so that as the fabric enters the slot in the presser foot, it will be in substantially vertical position, as indicated in Fig. 7. The trimmer blade trims off the portion of the fabric extending above the blade, after which the trimmed edges are abutted and are joined by the cross threads indicated at T in Fig. 8. The trimmed-off strip S is deflected by the deflector 44 to one side of the stitching mechanism.

By increasing or decreasing the fold formed in the fabric, (that is, the amount of fabric which is cut from the piece,) tubular articles may be shaped and the trimmed edges joined. It will also be understood that two separate sections may be fed to the machine, and the deflector 21 will raise the edges so they will be substantially vertical and in position for action by the trimming mechanism.

It is obvious that minor changes in the details of construction may be made, without departing from the spirit of the invention as set forth in the appended claims.

Having thus described my invention, what I claim as new and desire to secure by Letters Patent, is:

1. A sewing machine including in combination, a presser foot having a recess in its upper face forming a central boss provided with a needle opening, a trimming blade, means for holding the blade in said recess, said presser foot having a slot in its forward end extending to said boss, a movable trimming blade coöperating with the blade carried by the presser foot, said presser foot having means for supporting the movable blade, whereby the same may be adjusted vertically, and a deflector carried by the presser foot and extending across said guiding slot for deflecting the trimmed off strip.

2. A sewing machine including in combination, a needle, a needle lever, means for oscillating the needle lever, a presser foot, a trimming mechanism carried by said presser foot and including a trimming blade moving in a substantially horizontal plane, a rock lever pivotally supported by the presser foot and carrying said trimming blade, a link connected to said rock lever for oscillating the same, and means for connecting said link to said needle lever.

3. A sewing machine including in combination, a needle, a needle lever, means for oscillating the needle lever, a presser foot, a trimming mechanism carried by said presser foot and including a trimming blade moving in a substantially horizontal plane, a rock lever pivotally supported by the presser foot and carrying said trimming blade, a link connected to said rock lever for oscillating the same, a second rock lever mounted on the machine frame and having an adjustable connection with said link, and means for oscillating said second rock lever from the needle lever.

4. A sewing machine including in combination, a presser foot having an extension, a trimming mechanism including a trimming blade moving in a substantially horizontal plane, a vertically adjustable arm fixed on said extension, a lever carried by said arm and supporting said movable blade, and means for oscillating said lever.

5. A sewing machine including in combination, a presser foot having an extension, a trimming mechanism including a trimming blade moving in a horizontal plane, an arm adjustably supported by said extension, a rock lever mounted on said arm and carrying said movable blade, a shaft supporting said rock lever, said arm having an extended bearing for said shaft for holding said rock lever from tilting on its pivotal axis.

6. A sewing machine including in combination, a presser foot having an extension, a trimming mechanism including a trimming blade moving in a horizontal plane, an arm adjustably supported by said extension, a rock lever mounted on said arm and carrying said movable blade, a shaft supporting said rock lever, said arm having an extended bearing for said shaft for holding said rock lever from tilting on its pivotal axis, a needle, a needle lever for reciprocating said needle, a rock lever oscillated by said needle lever, and a link for connecting said last named rock lever with the rock lever on the presser foot for oscillating the same.

7. A sewing machine including in combination, a presser foot having an extension, a trimming mechanism including a trimming blade moving in a horizontal plane, an arm adjustably supported by said extension, a rock lever mounted on said arm and carrying said movable blade, a shaft supporting said rock lever, said arm having an extended bearing for said shaft for holding said rock lever from tilting on its pivotal axis, and an adjustable block carried by the presser foot and bearing on said rock lever adjacent the trimming blade.

8. A sewing machine including in combination, a presser foot, a stationary trimming member carried thereby, said presser foot having a recess formed therein for a trimming blade moving in a horizontal plane, an arm carried by the presser foot and bearing on said movable blade adjacent the trimming line for holding said blade in proper coöperation with the stationary trimming member.

9. A sewing machine including in combination, a presser foot, a stationary trimming member carried thereby, said presser foot having a recess formed therein for a trimming blade moving in a horizontal plane, a bridge plate secured to said presser foot and having an arm bearing on the movable blade at a point adjacent the trimming line for holding said blade in proper coöperative relation with said stationary trimming member.

In testimony whereof, I affix my signature in the presence of two witnesses.

JAMES R. MOFFATT.

Witnesses:
A. C. ABEL,
A. B. CLOTHIER.